(12) United States Patent
Barr

(10) Patent No.: US 10,233,637 B2
(45) Date of Patent: Mar. 19, 2019

(54) WEB FRAME

(71) Applicant: Owen Derek Barr, Gosford (AU)

(72) Inventor: Owen Derek Barr, Gosford (AU)

(*) Notice: Subject to any disclaimer, the term of this patent is extended or adjusted under 35 U.S.C. 154(b) by 0 days.

(21) Appl. No.: 15/494,731

(22) Filed: Apr. 24, 2017

(65) Prior Publication Data

US 2017/0226737 A1 Aug. 10, 2017

Related U.S. Application Data

(60) Continuation of application No. 15/099,416, filed on Apr. 14, 2016, now Pat. No. 9,663,952, which is a
(Continued)

(51) Int. Cl.
*E04B 2/92* (2006.01)
*E04C 2/34* (2006.01)
(Continued)

(52) U.S. Cl.
CPC .................. *E04B 2/92* (2013.01); *B32B 3/08* (2013.01); *B32B 3/085* (2013.01); *B32B 3/266* (2013.01); *B32B 3/30* (2013.01); *B32B 5/022* (2013.01); *B32B 5/024* (2013.01); *B32B 5/028* (2013.01); *B32B 13/00* (2013.01); *B32B 13/14* (2013.01); *B32B 15/04* (2013.01); *B32B 15/14* (2013.01);
(Continued)

(58) Field of Classification Search
CPC ...... E04F 15/107; E04F 13/0866; E04D 1/28; E04C 2/46; E04C 2/34; E04B 2103/06; E04B 2103/04; E04B 2103/02; E04B 2001/7691; E04B 2/92; E04B 2/72; E04B 1/90; E04B 1/80; E04B 1/7076; E04B 1/7069; E04B 1/625; B23B 3/08; B23B 3/30; B23B 5/022; B23B 5/024; B23B 5/028; B23B 13/00; B23B 13/14; B23B 15/04; B23B 15/14; B23B 21/02; B23B 21/10; B23B 2307/102; B23B 2307/304; B23B 2307/3065; B23B 2307/56; B23B 2307/712; B23B 2307/724; B23B 2419/00
See application file for complete search history.

(56) References Cited

U.S. PATENT DOCUMENTS 2,256,961 A 9/1941 Baillie et al.
3,020,986 A 2/1962 Kirk et al.
(Continued)

FOREIGN PATENT DOCUMENTS

WO 2010009713 A2 1/2010

*Primary Examiner* — James M Ference

(57) ABSTRACT

The web frame is a bonded assembly of panels and porous blanket layers, separated by an arrangement of isolated spacers. The panels and spacers are covered with a bonding means. A coating covers inner surfaces of the panels and spacers. The porous blanket is compressed and pinned between these panels, by spacers that are arranged as isolated nodes or columns The spacers have sharpened ends that penetrate the blanket and connect with the opposing panel. The web frame assembly provides thermal and sound insulation for buildings and other solid objects. These web frames are lightweight, durable, and permeable. Capillaries and passages throughout the panels and fibers of the blanket allow passage of moisture and air, thereby assisting in the management of condensation within the web frame.

9 Claims, 6 Drawing Sheets

Related U.S. Application Data division of application No. 14/395,708, filed as application No. PCT/AU2013/000476 on May 10, 2013, now Pat. No. 9,315,988.

(51) Int. Cl.

| | | |
|---|---|---|
| *E04B 1/80* | (2006.01) | |
| *E04B 1/62* | (2006.01) | |
| *E04B 2/72* | (2006.01) | |
| *E04B 2/00* | (2006.01) | |
| *B32B 5/02* | (2006.01) | |
| *B32B 13/00* | (2006.01) | |
| *B32B 13/14* | (2006.01) | |
| *B32B 15/14* | (2006.01) | |
| *B32B 21/02* | (2006.01) | |
| *B32B 21/10* | (2006.01) | |
| *B32B 3/08* | (2006.01) | |
| *B32B 3/30* | (2006.01) | |
| *B32B 15/04* | (2006.01) | |
| *E04B 1/70* | (2006.01) | |
| *E04B 1/90* | (2006.01) | |
| *E04D 1/28* | (2006.01) | |
| *E04F 13/08* | (2006.01) | |
| *E04F 15/10* | (2006.01) | |
| *B32B 3/26* | (2006.01) | |
| *E04B 1/76* | (2006.01) | |

(52) U.S. Cl.
CPC .............. *B32B 21/02* (2013.01); *B32B 21/10* (2013.01); *E04B 1/625* (2013.01); *E04B 1/7076* (2013.01); *E04B 1/80* (2013.01); *E04B 1/90* (2013.01); *E04B 2/72* (2013.01); *E04C 2/34* (2013.01); *E04C 2/46* (2013.01); *E04D 1/28* (2013.01); *E04F 13/0866* (2013.01); *E04F 15/107* (2013.01); *B32B 2307/102* (2013.01); *B32B 2307/304* (2013.01); *B32B 2307/3065* (2013.01); *B32B 2307/56* (2013.01); *B32B 2307/712* (2013.01); *B32B 2307/724* (2013.01); *B32B 2419/00* (2013.01); *B32B 2607/00* (2013.01); *E04B 1/7069* (2013.01); *E04B 2001/7691* (2013.01); *E04B 2103/02* (2013.01); *E04B 2103/04* (2013.01); *E04B 2103/06* (2013.01); *E04C 2002/3483* (2013.01)

(56) References Cited

U.S. PATENT DOCUMENTS

| | | | |
|---|---|---|---|
| 3,216,167 A | 11/1965 | Roberts | |
| 3,317,363 A * | 5/1967 | Weber | B29C 44/22 156/210 |
| 3,435,577 A * | 4/1969 | O'Leary | E04F 13/147 156/71 |
| 3,819,466 A * | 6/1974 | Winfield | E04C 2/3405 428/175 |
| 4,035,539 A | 7/1977 | Luboshez | |
| 4,068,434 A | 1/1978 | Day et al. | |
| 4,114,333 A | 9/1978 | Jones et al. | |
| 4,177,312 A * | 12/1979 | Rasen | B32B 3/28 156/167 |
| 4,265,067 A | 5/1981 | Palmer | |
| 4,294,329 A | 10/1981 | Rose et al. | |
| 4,318,453 A | 3/1982 | Rose et al. | |
| 4,361,613 A * | 11/1982 | Bogner | B32B 5/18 156/212 |
| 4,386,128 A * | 5/1983 | Yoshikawa | B32B 3/28 428/152 |
| 4,409,274 A * | 10/1983 | Chaplin | B32B 3/28 156/210 |
| 4,421,811 A | 12/1983 | Rose et al. | |
| 4,433,021 A | 2/1984 | Riel | |
| 4,496,024 A * | 1/1985 | Wolf | E04B 1/86 156/290 |
| 4,507,901 A | 4/1985 | Carroll | |
| 4,541,879 A * | 9/1985 | Riel | B32B 3/12 156/182 |
| 4,589,240 A | 5/1986 | Kendall et al. | |
| 4,606,168 A * | 8/1986 | Fuhrer | E04F 13/045 52/410 |
| 4,730,953 A * | 3/1988 | Tarko | E02D 31/02 405/45 |
| 4,733,989 A * | 3/1988 | Harriett | B32B 27/20 405/43 |
| 4,741,136 A | 5/1988 | Thompson | |
| 4,761,928 A | 8/1988 | Pichette | |
| 4,811,538 A | 3/1989 | Lehnert et al. | |
| 4,840,515 A * | 6/1989 | Freese | E02B 11/005 405/36 |
| 4,841,702 A | 6/1989 | Huettemann | |
| 4,841,705 A * | 6/1989 | Fuhrer | E04F 13/04 52/309.13 |
| 4,850,093 A * | 7/1989 | Parente | B21D 47/00 29/428 |
| 4,869,037 A | 9/1989 | Murphy | |
| 4,943,185 A * | 7/1990 | McGuckin | E02D 31/02 210/170.07 |
| 4,954,383 A | 9/1990 | King et al. | |
| 4,956,951 A * | 9/1990 | Kannankeril | B29C 47/0021 405/36 |
| 4,990,391 A * | 2/1991 | Veta | B32B 3/12 156/292 |
| 5,009,043 A * | 4/1991 | Kurrasch | E04B 1/8227 181/290 |
| 5,041,323 A * | 8/1991 | Rose | B32B 3/12 181/292 |
| 5,060,441 A | 10/1991 | Pichette | |
| 5,175,975 A | 1/1993 | Benson et al. | |
| 5,187,915 A * | 2/1993 | Alexander | E04C 2/528 52/169.14 |
| 5,440,846 A | 8/1995 | Record | |
| 5,443,250 A | 8/1995 | Gosslinghoff | |
| 5,487,248 A * | 1/1996 | Artzer | E04C 2/044 52/309.11 |
| 5,519,971 A | 5/1996 | Ramirez | |
| 5,598,673 A * | 2/1997 | Atkins | E04B 1/7046 52/302.1 |
| 5,678,369 A | 10/1997 | Ishikawa et al. | |
| 5,688,073 A * | 11/1997 | Brodeur | E02B 11/00 405/36 |
| 5,753,378 A | 5/1998 | Tebbe | |
| 5,958,551 A * | 9/1999 | Garcia-Ochoa | B32B 3/10 428/137 |
| 6,041,561 A | 3/2000 | LeBlang | |
| 6,080,495 A * | 6/2000 | Wright | B32B 7/12 156/205 |
| 6,114,003 A | 9/2000 | Gottfried | |
| 6,131,353 A * | 10/2000 | Egan | B32B 5/02 52/309.1 |
| 6,182,413 B1 | 2/2001 | Magnusson | |
| 6,205,729 B1 | 3/2001 | Porter | |
| 6,240,704 B1 | 6/2001 | Porter | |
| 6,279,284 B1 * | 8/2001 | Moras | E04B 1/10 52/105 |
| 6,282,853 B1 * | 9/2001 | Blaney | E04C 2/044 52/223.7 |
| 6,355,333 B1 * | 3/2002 | Waggoner | E04B 1/62 428/174 |
| 6,371,242 B1 * | 4/2002 | Wilson | B32B 3/12 181/210 |
| 6,418,686 B1 * | 7/2002 | Record | E04C 2/292 52/284 |
| 6,594,965 B2 | 7/2003 | Coulton | |
| 6,634,148 B2 | 10/2003 | Shidler | |

(56) References Cited

U.S. PATENT DOCUMENTS

| | | | |
|---|---|---|---|
| 6,684,579 B2* | 2/2004 | Brunson | E04B 1/7061 52/169.14 |
| 6,691,472 B2* | 2/2004 | Hubert | E02D 31/02 405/107 |
| 6,701,683 B2 | 3/2004 | Messenger et al. | |
| RE38,508 E * | 4/2004 | Wright | B32B 7/12 156/205 |
| 6,725,616 B1 | 4/2004 | Pease | |
| 6,729,090 B2 | 5/2004 | Messenger et al. | |
| 6,745,531 B1* | 6/2004 | Egan | E04B 1/70 52/302.1 |
| 6,786,013 B2* | 9/2004 | Coulton | B32B 3/28 405/45 |
| 6,804,922 B1* | 10/2004 | Egan | B32B 5/02 52/309.1 |
| 7,288,326 B2* | 10/2007 | Elzey | C22F 1/006 428/179 |
| 7,320,739 B2* | 1/2008 | Thompson, Jr. | B32B 5/02 156/196 |
| 7,393,577 B2* | 7/2008 | Day | B32B 5/22 428/121 |
| 7,419,713 B2 | 9/2008 | Wilkens et al. | |
| 7,883,763 B2* | 2/2011 | Tinianov | B32B 27/14 156/291 |
| 7,984,594 B1* | 7/2011 | Propst | B32B 3/06 442/42 |
| 8,291,668 B2* | 10/2012 | Iske | E02D 31/02 52/414 |
| 2002/0053176 A1* | 5/2002 | Colson | B31D 3/00 52/506.06 |
| 2002/0106503 A1 | 8/2002 | Monk et al. | |
| 2002/0189182 A1 | 12/2002 | Record | |
| 2003/0033774 A1 | 2/2003 | Porter | |
| 2003/0159400 A1 | 8/2003 | Forrester et al. | |
| 2004/0003558 A1* | 1/2004 | Collins | E04B 1/4178 52/302.1 |
| 2004/0045242 A1* | 3/2004 | Lake | B32B 5/02 52/396.02 |
| 2004/0163345 A1 | 8/2004 | Alderman | |
| 2004/0177590 A1 | 9/2004 | Nudo et al. | |
| 2004/0185212 A1 | 9/2004 | Bogrett et al. | |
| 2005/0055930 A1* | 3/2005 | Imbabi | B32B 5/18 52/506.01 |
| 2005/0086900 A1 | 4/2005 | Reynolds | |
| 2005/0188649 A1 | 9/2005 | Hagen | |
| 2006/0102419 A1 | 5/2006 | Mitchell et al. | |
| 2006/0123723 A1* | 6/2006 | Weir | B32B 5/245 52/302.1 |
| 2006/0174585 A1 | 8/2006 | Barr | |
| 2007/0125042 A1 | 6/2007 | Hughes et al. | |
| 2007/0256379 A1 | 11/2007 | Edwards | |
| 2008/0041004 A1 | 2/2008 | Gibbar et al. | |
| 2008/0236077 A1 | 10/2008 | Oreilly | |
| 2008/0245010 A1 | 10/2008 | Pollack | |
| 2008/0295450 A1 | 12/2008 | Yogev | |
| 2009/0035510 A1* | 2/2009 | Chakrabarti | E04C 2/296 428/116 |
| 2009/0038262 A1 | 2/2009 | Marschke | |
| 2009/0126291 A1* | 5/2009 | Iske | E02D 19/18 52/173.1 |
| 2009/0235599 A1 | 9/2009 | Ware et al. | |
| 2009/0255201 A1* | 10/2009 | Kraus, Jr. | B29C 39/18 52/309.5 |
| 2009/0272056 A1 | 11/2009 | Koupal | |
| 2010/0005746 A1 | 1/2010 | Lemay | |
| 2010/0108438 A1* | 5/2010 | Duffy | B32B 3/266 181/290 |
| 2010/0151189 A1* | 6/2010 | Chakrabarti | E04C 2/296 428/119 |
| 2011/0020599 A1 | 1/2011 | Roy et al. | |
| 2011/0214559 A1 | 9/2011 | Lampo et al. | |
| 2011/0250384 A1* | 10/2011 | Sumi | B60R 5/044 428/118 |
| 2011/0258944 A1* | 10/2011 | Radoane | E04B 2/58 52/62 |
| 2011/0296781 A1 | 12/2011 | McCary | |
| 2012/0090266 A1* | 4/2012 | McCary | E04D 12/002 52/794.1 |
| 2012/0174511 A1* | 7/2012 | Harding | B66F 9/142 52/302.1 |
| 2015/0121791 A1* | 5/2015 | Barr | E04C 2/34 52/309.15 |

\* cited by examiner

WEB FRAME

This application is a continuation application of U.S. patent application Ser. No. 15/099,416, filed on Apr. 14, 2016, which in turn claims priority under U.S. Pat. No. 9,315,988 issued on Apr. 19, 2016 and filed on Oct. 20, 2014, which in turn claims priority under 35 U.S.C. § 371 to application no. PCT/AU2013/000476, filed on May 10, 2013, and the contents of all of the applications are hereby incorporated by reference in their entirety.

TECHNICAL FIELD

The invention relates to a multi layer web frame that attaches to a wall, floor, ceiling or roof of a building or solid object. The invention provides thermal and sound insulation while assisting the management of condensation within the frame. The invention also relates to a method of assembling the items that make the multi-layer web frame.

BACKGROUND ART

It is known to those who are familiar with frames and panels applied to buildings as cladding, lining or cavity panels, that these panels have a protective covering which seals the panels from water. However such sealants create an impervious surface which prevents moisture from escaping from within or passing through the panels. Absence of capillaries through these panels prevents the panel from breathing, resulting in an accumulation of moisture.

In current art, panels and impervious insulation assemblies are placed within wall cavities where condensation accumulates undetected in the early life of the building. Consequently, the trapped condensation causes dampness in the adjacent frames leading to building deterioration.

Accumulation of condensation also provides moisture for moss and mildew to grow. These growths are considered major health risks to inhabitants of buildings. To compensate for this moisture accumulation, existing art includes are a number of add-on processes that include the creation of additional escape channels, using battens and furring members behind the panels. These additional processes require skilled labour, project time and costs. These add-on channels are subject to blockage from construction material and waste.

It is known to those who are familiar in the art of covering buildings and other objects that materials should be easy to handle. However, many of these existing panel systems are heavy, requiring expensive lifting apparatus to apply them to a building.

Existing composite panel systems that use insulation layers between panels, fail to provide sufficient passages within the assembly for air or moisture to pass. This lack of ventilation causes condensation.

Existing insulation systems place a metallic reflective film within a wall cavity to reflect heat back towards the cavity. In such circumstances, the air in the cavity gains heat which is reflected back into the outer wall material—the main source of heat initially. This outer wall material in turn radiates heat back into the cavity. This heat compounding process continues with a resulting heat gain in the cavity air, which has no ventilation. This whole process illustrates the inadequate insulation of such art.

Existing bulk insulation products are often poorly supported within existing insulating systems. The lack of adequate and enduring support of the bulk insulation results in the fibres sagging, which eventually leaves a thick collapsed layer near the base of the panel and thin layer of bulk insulation near the top of the panel. The thin layer has considerably reduced capacity of insulation compared with the original capacity, leading to reduced heat and sound insulation after an indefinite period.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

The invention describes a web frame which consists of an assembly of materials that provide thermal and sound insulation, and provide passages for moisture and air to permeate. The web frame has an outer panel bonded coextensively to a first web-sandwich.

In a further embodiment of the web frame, an outer panel is bonded coextensively to a first web-sandwich, wherein the first web-sandwich is bonded coextensively to one or more web-sandwiches in series. Each web-sandwich comprises an inner panel, means bonding, surface coatings on the inner surfaces of the panels, an assembly of spacer items that separate opposing panels, and a blanket layer confined to a finite space between opposing panels.

A blanket layer is pressed between opposing panels, pinned to the opposing panel by an assembly of spacer items, which prevent the blanket layer from sagging.

The spacer items have sharpened ends that penetrate the blanket layer thereby obtaining a positive connection between spacer items and the opposing panel.

The spaces between strands and openings within the porous blanket layer provides a drainage passage within the blanket layer that allows moisture to pass through the web frame. The space ranges from 0.01 mm to 2 mm, but preferably 0.02 mm space.

In one embodiment of a web-sandwich the blanket layer is an open-weaved bulk insulation.

In a further embodiment of a web-sandwich the blanket layer is a woven fabric.

In a further embodiment of a web-sandwich the blanket layer is a non-woven fabric or batt with openings throughout the blanket layer.

In a further embodiment of a web-sandwich the blanket layer is a multi-layered mesh.

The inner surfaces of all panels are bonded to and covered with a coating or film, being selected from one or more than one of the following group:
 (i) metallic reflective film;
 (ii) metallic reflective coating;
 (iii) weatherproof coating; and
 (iv) fire-retardant coating.

In one particular embodiment of the web frame, the inner surfaces of the panels are coated with metallic reflective coating, which provides thermal insulation by reflection. The limited amount of heat emitted through these reflective surfaces heats the air in the confined space between panels, wherein warm air dissipates through the passages of the adjacent porous blanket.

In a further embodiment of the invention, fine capillaries exist throughout the panels and surface coverings, the capillaries providing passages through which air and moisture may pass.

In a further embodiment of the invention the panels, spacer items, means bonding, surface coverings and blanket layers are selected from a group of lightweight materials, and assembled to form a lightweight web frame. This lightweight web frame is easy to handle, and reduces application costs In a further application of the invention, the web frame can be applied to a wall, facade, ceiling, floor, or a roof.

In further application of the invention, the web frame functions as a structural, stand alone wall.

The outer panel is made from materials that are durable and resilient and selected from one or more than one of a group of materials comprising:
(i) reinforced concrete;
(ii) autoclaved aerated concrete;
(iii) polyurethane;
(iv) polystyrene;
(v) polypropylene;
(vi) plywood;
(vii) fibre cement;
(viii) metal sheeting;
(ix) particle board;
(x) cardboard; and
(xi) timber.

The outer panel is typically 2 mm to 200 mm thick, and most preferably 5 mm to 20 mm thick.

The inner panels are made from materials that are durable, resilient and flexible, that are materials selected from one or more than one of a group comprising:
(i) reinforced concrete;
(ii) autoclaved aerated concrete;
(iii) polyurethane;
(iv) polystyrene;
(v) polypropylene;
(vi) plywood;
(vii) fibre cement;
(viii) metal sheeting;
(ix) particle board;
(x) cardboard; and
(xi) timber.

The inner panels are typically 2 mm to 150 mm thick, and most preferably 5 mm to 20 mm thick.

The opposing panels are spaced apart by a series of spacer-nodes that are arranged in an assembly of spacer items, wherein these spacer-nodes are independent and separated. The separation of these spacer-nodes is typically in a range from 20 mm to 200 mm, and most preferably 50 mm separation.

The spacer-nodes protrude from the adjacent inner panel on which they are formed. The node protrusion dimension ranges from 2 mm to 50 mm, but typically protrude 20 mm.

In another configuration, the opposing panels are spaced apart by a series of spacer-columns arranged in such an assembly that these independent spacer-columns are separated from each other. The separation between these spacer-columns is typically in a range from 20 mm to 200 mm, and most preferably 50 mm separation.

The spacer-columns butt onto and are positioned between opposing panels, the spacer-columns each being isolated items not formed with any panel. The spacer-column length ranges from 2 mm to 50 mm, but typically 20 mm.

The blanket layer is confined to a defined space between opposing panels. The blanket layer is compressed to a thickness ranging from 2 mm to 50 mm, but typically 20 mm thick.

The web frame has a cover-sheet attached to its outer edges, around the perimeter of the web frame. The cover-sheet is made from material that is durable, flexible, weatherproof, fire-retarding and thermally reflective.

The cover-sheet extends beyond the perimeter of the web frame, wherein the extended portion of the cover-sheet is folded over and attached to the outer edges of the web frame around the perimeter.

The cover-sheet protects the outer edges of the web frame from access of moisture, pollution and external heat.

It should be understood that words used in this application have the following meaning:
(i) web-sandwich, means a laminate of a panel, blanket, spacers, and surface coverings bonded together coextensively to create a compressed sandwich of defined building items;
(ii) web frame, means an assembly of an outer panel bonded to a web-sandwich that may be further bonded to another web-sandwich to create a frame;
(iii) nodes, means material that is formed on the surface of an inner panel and protrudes from the face of the panel, wherein the node acts as a spacer between opposing panels; wherein the node is separated from adjacent nodes, and may have a variety of shapes;
(iv) spacer-columns are isolated items of material not formed with any panel, wherein the spacer-columns are made in a variety of shapes and separate opposing panels;
(v) capillaries, means the fine air passages throughout a material;
(vi) Passages, are finite openings throughout the blanket layers that permit air and moisture to permeate;
(vii) Cover-sheets, are defined as sheets or webbing of a flexible, resilient permeable material that extends from the web frame and folds over to cover the outer edges of the web frame.

BRIEF DESCRIPTION OF THE DRAWINGS

Specific embodiments of the invention will now be described by example only and with reference to the accompanying drawings in which.

DETAILED DESCRIPTION OF A PREFERRED EMBODIMENT

Figure 1:
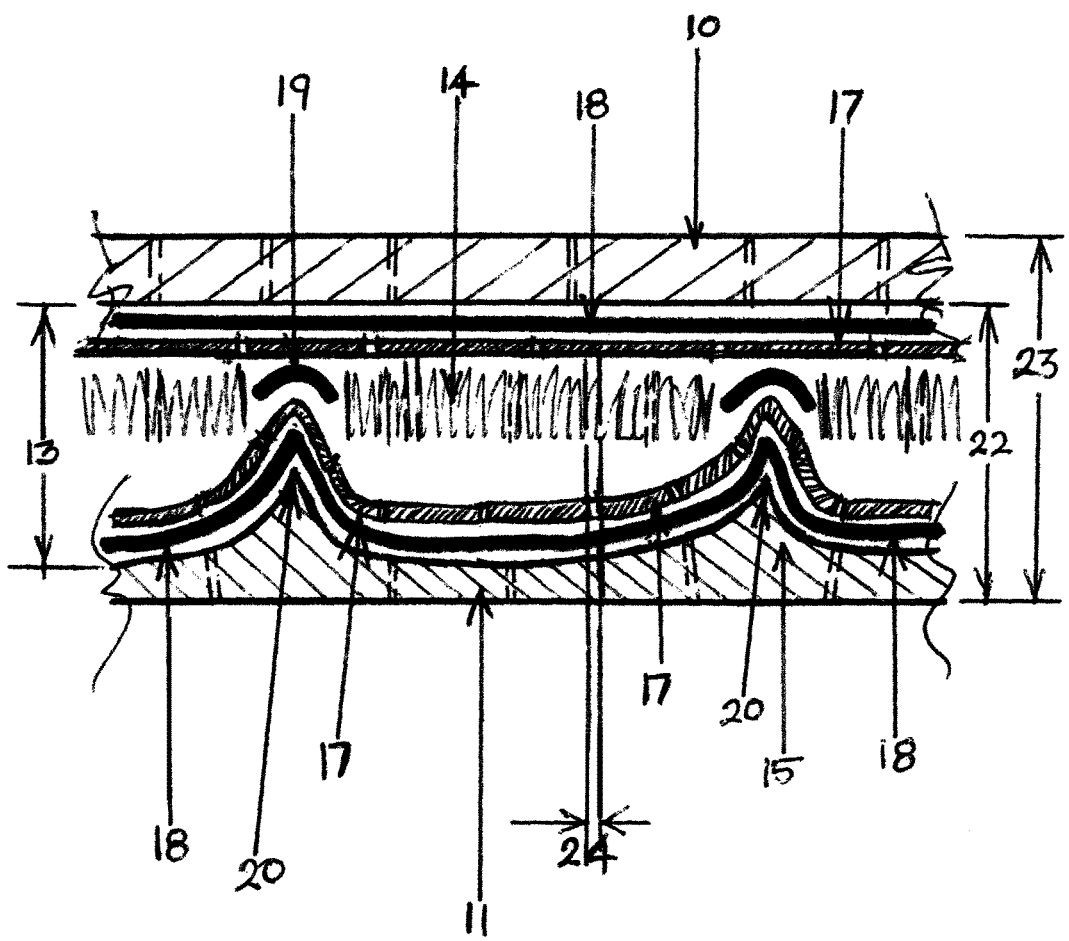
FIG. 1 shows a first embodiment of a web frame with a web-sandwich having a formed inner panel.

Referring to FIG. 1 wherein web frame 23 comprising an outer panel 10 whose thickness ranges between 2 mm and 200 mm, and in the particular embodiment the outer panel 10 is bonded coextensively to a web-sandwich 22 comprising an inner panel 11, a defined open zone 13 in which a blanket layer 14 is confined, with spacer-nodes 15, surface covering 17 and means bonding 18.

The surface covering 17 is bonded to all inner surfaces by a bonding means 18. The blanket 14 is pinned and compressed between the outer panel 10 and the inner panel 11 by means of an assembly of spacer-nodes 15 arranged as isolated nodes separate from each other and formed on the surface of the inner panel 11.

The blanket layer 14 is made of one or more than one of a selection of materials that are porous, flexible, durable, and resilient.

The thickness of the compressed blanket 14 ranges between 2 mm and 50 mm, but preferably 20 mm.

The spacer nodes 15 have sharpened tips 20 that penetrate the blanket 14 and contact the opposing panel. The sharpened tips 20 of the spacer-nodes 15 have bonding means 19 at each tip to bond the spacer-node 15 to the outer panel 10.

The blanket 14 consists of a porous material with voids and passages 24 between fibres and strands of the blanket layer 14, wherein these voids 24 allow air and moisture to pass throughout the blanket layer 14. These voids and passages 24 have a diameter in the range of 0.01 mm and 2 mm, but preferably 0.02 mm diameter.

Figure 2:
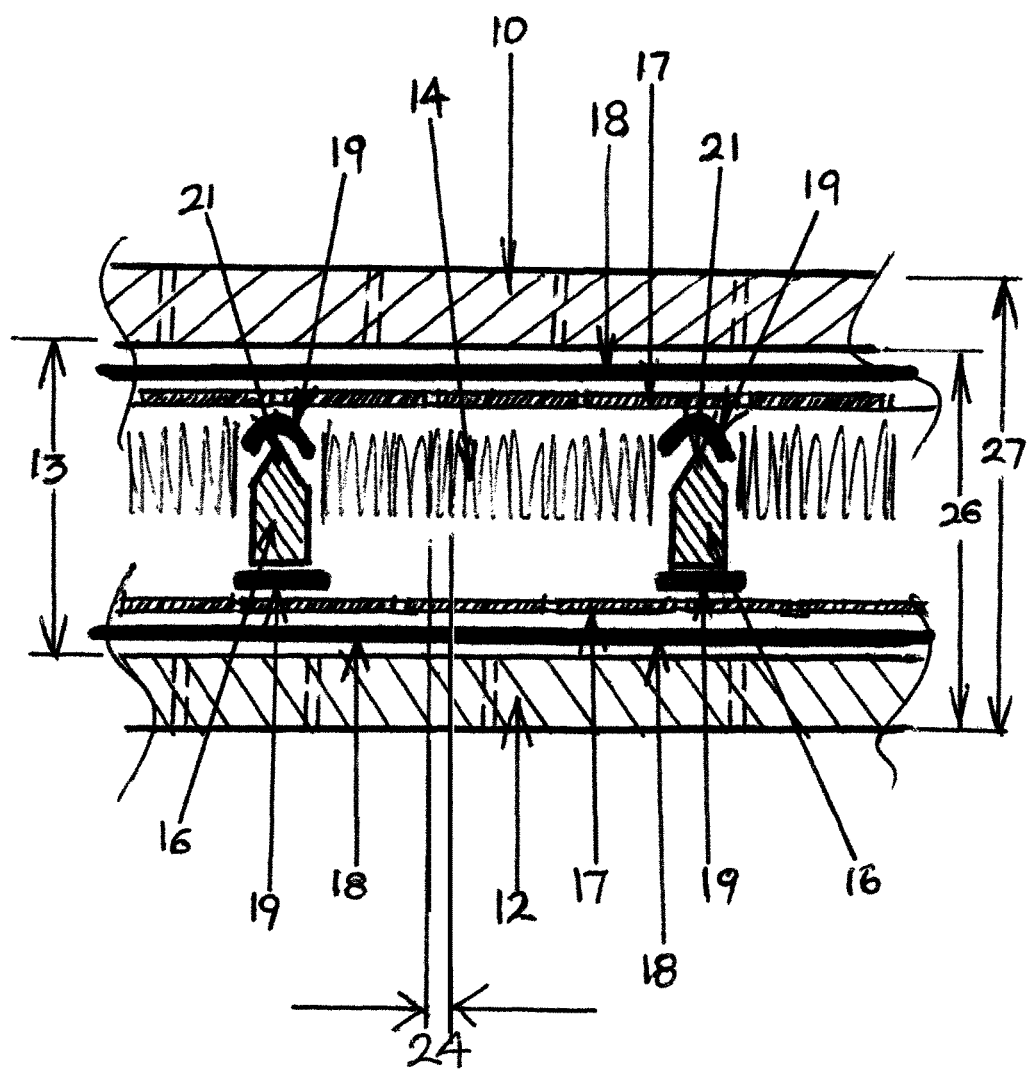
FIG. 2 shows a second embodiment of a web frame with an alternative of web-sandwich having a planar inner panel, and spacer-columns.

Referring to FIG. 2 where a web frame 27 comprising an outer panel 10 whose thickness is in the range of 2 mm and 200 mm, and in the particular embodiment the outer panel 10 is bonded coextensively to a web-sandwich 26 comprising an inner panel 12, a defined zone 13 in which a blanket layer 14 is confined, spacer-columns 16, surface coverings 17 and means bonding 18.

The surface covering 17 is bonded to all inner surfaces of all panels by a bonding means 18.

The blanket 14 is pinned and compressed between the outer panel 10 and the inner panel 12 by means of an assembly of spacer-columns 16 arranged as isolated columns separate from each other and located in a plane parallel to and between opposing panels. The thickness of the compressed blanket layer 14 ranges between 2 mm and 50 mm, but preferably 20 mm thick.

The spacer-columns 16 have sharpened tips 21 that penetrate the blanket 14 and contact the opposing panel. The sharpened tips 21 of the spacer-columns 16 have bonding means 19 at each tip 21 to bond with opposing panels.

The blanket layer 14 consists of a porous material having voids and passages 24 between fibres and strands of the blanket 14, wherein these passages 24 allow air and moisture to permeate through the blanket layer 14.

These voids and passages 24 have a diameter of openings or gaps between fibres in a range of 0.01 mm and 2 mm, but preferably 0.02 mm diameter.

Figure 3:
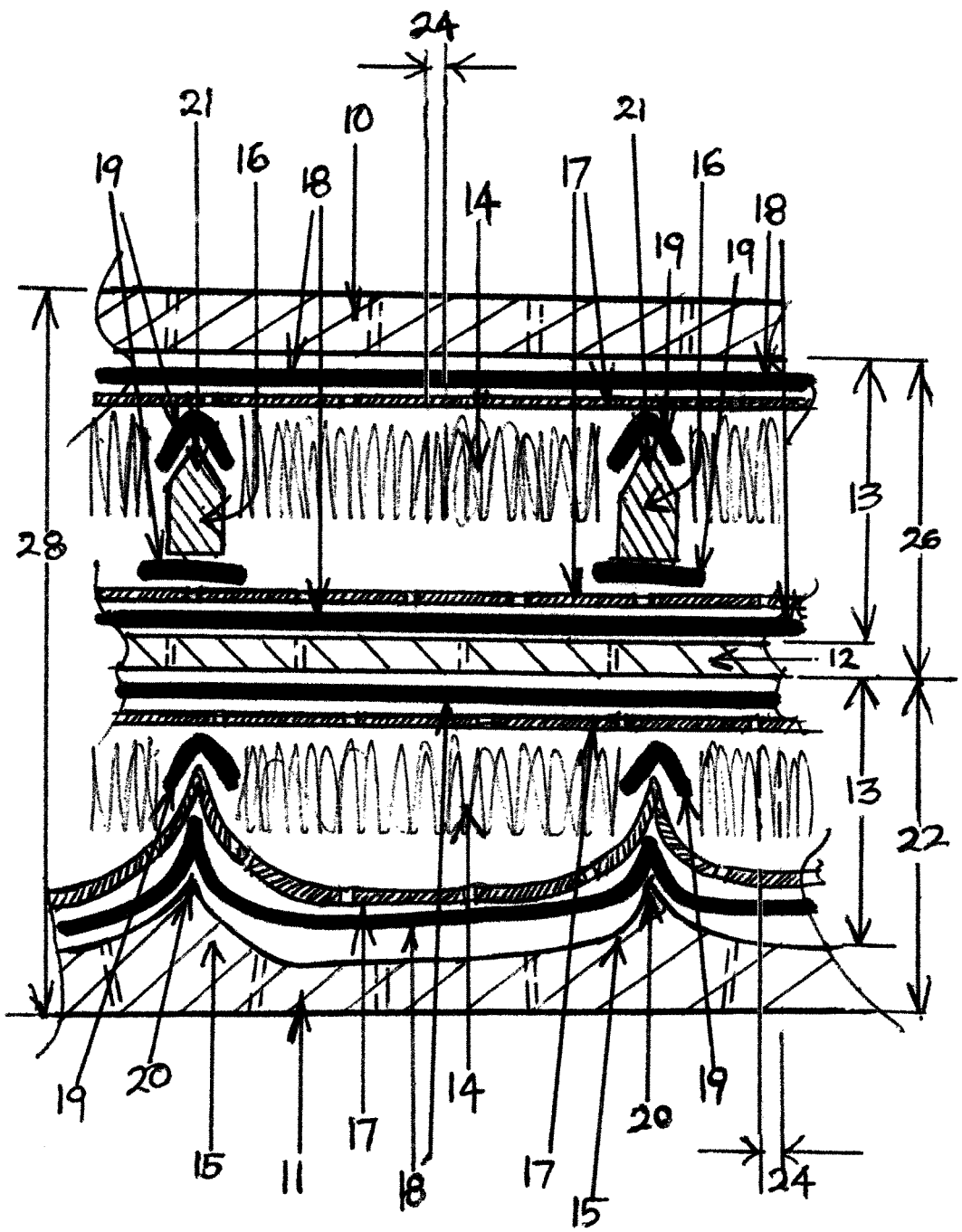
FIG. 3 shows a third embodiment of a web frame formed with two types of web-sandwich, one with a formed inner panel the other with a planar panel and spacer-columns.

FIG. 3 illustrates a combination of an outer panel 10 and two different web-sandwiches 22 and 26. In a further embodiment of the web frame 28, the outer panel 10 is bonded to and is coextensive with web-sandwich 26 as described in FIG. 2, wherein a further web-sandwich 22, as described in FIG. 1, is bonded to the first web-sandwich 26.

Figure 4:
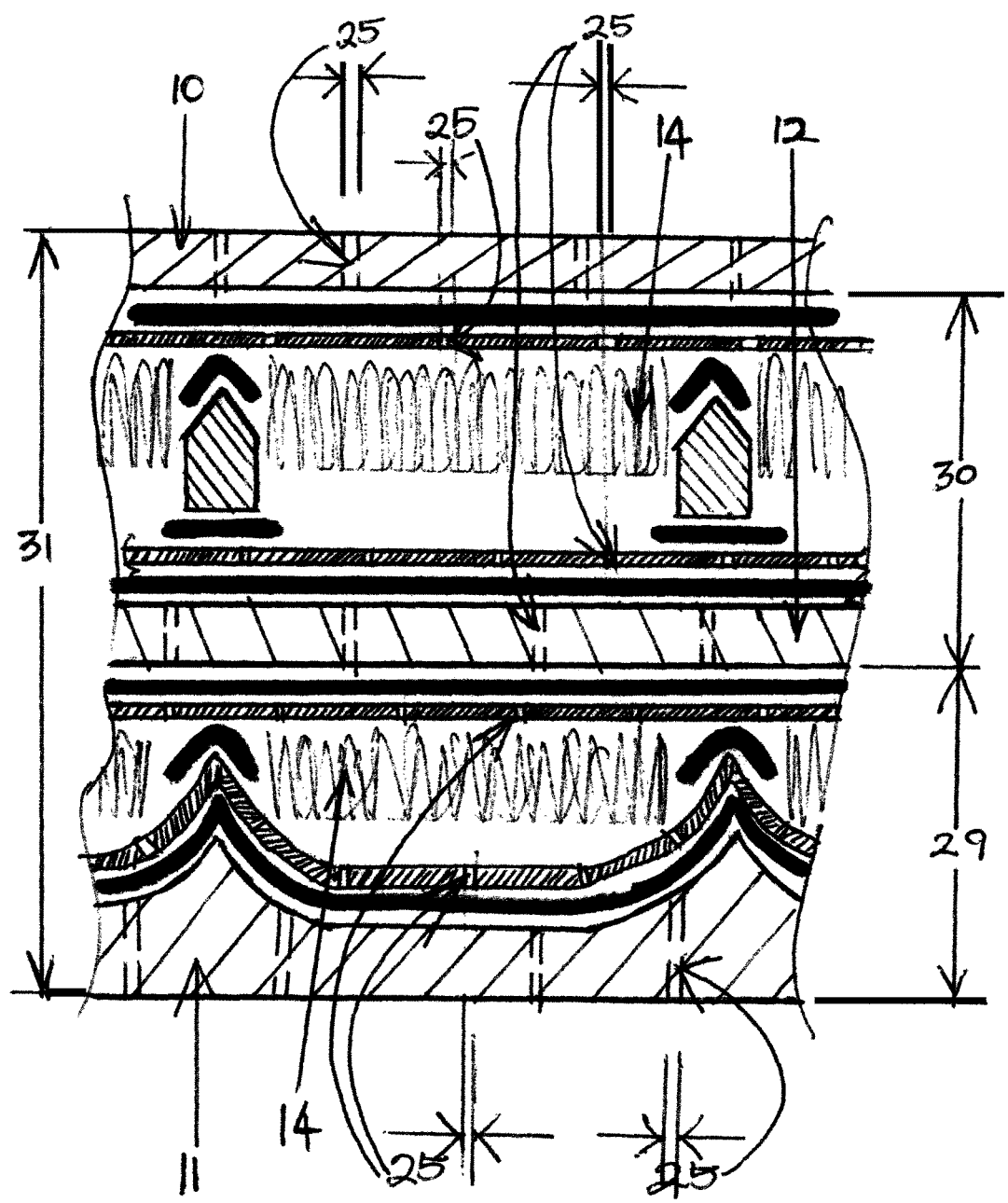
FIG. 4 shows a fourth embodiment of a web frame formed with two types of web-sandwiches having capillaries throughout.

FIG. 4 shows a further embodiment of a web frame 31, wherein fine capillaries 25 permeate the outer panel 10 and the web-sandwiches 29 and 30, and allow moisture and air through the web frame 31. The diameter of such capillaries 25 are in the range of 0.01 mm and 2 mm, and are spaced apart where such spacing ranges from 5 mm to 100 mm between adjacent capillaries.

Figure 5:
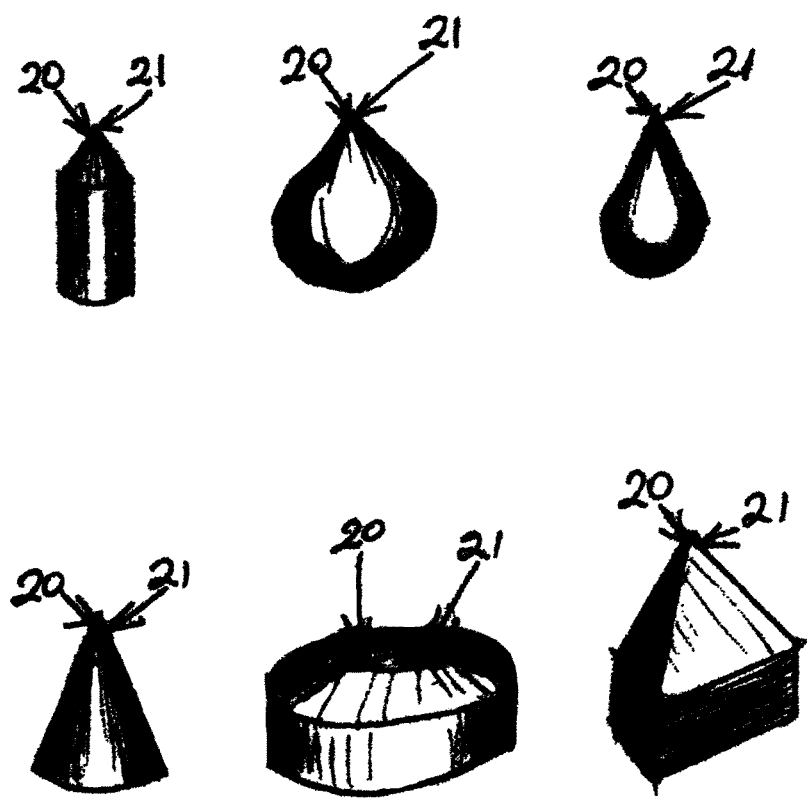
FIG. 5 shows a series of shapes that describe the spacers.

FIG. 5 illustrates the various alternative shapes of spacer-node 15 and spacer-columns 16, wherein the shapes shown comprise:

(i) Cylinder with sharpened ends 20 for spacer-node, and 21 for spacer-column;
(ii) Sphere with sharpened ends 20 for spacer-node, and 21 for spacer-column;
(iii) Ball with sharpened ends 20 for spacer-node; and 21 for spacer-column;
(iv) Cone with sharpened ends 20 for spacer-node, and 21 for spacer-column;
(v) Ring with sharpened ends 20 for spacer-node, and 21 for spacer-column; and
(vi) Block with sharpened ends 20 for spacer-node, and 21 for spacer-column.

The sharpened ends 20 and 21 respectively, penetrate the blanket layer 14 and pin the blanket to the opposing panel, preventing the blanket 14 from sagging.

Figure 6:
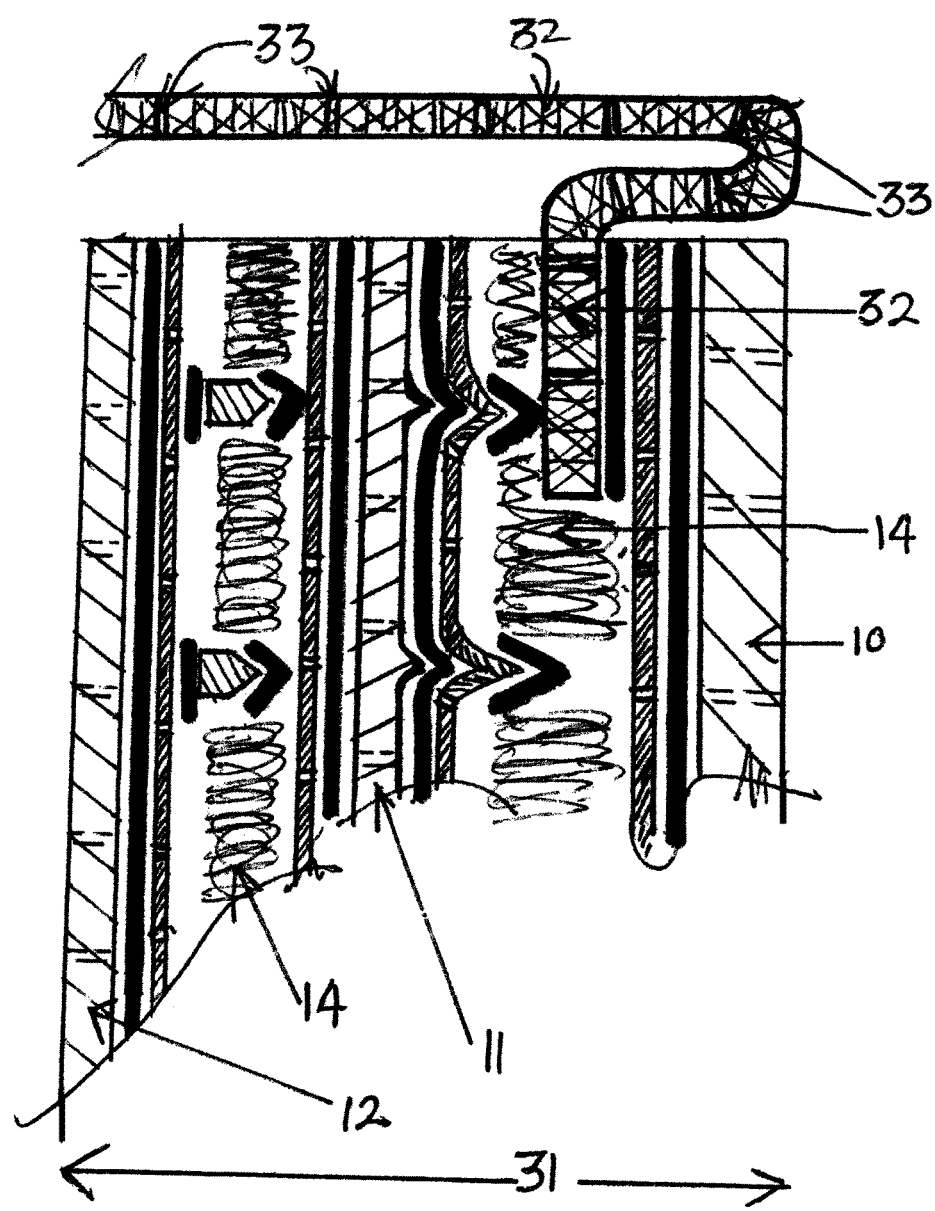
FIG. 6 shows a cover-sheet that wraps over the exposed edges of a web frame.

FIG. 6 illustrates a cover-sheet 32 which extends beyond the web frame 31, wherein the cover-sheet folds over the outer edge of the web frame 31 and is attached to the outer edge of web frame 31, thereby the cover-sheet 32 protects the outer edges of web frame 31 from weather, pollution, and thermal fluctuations.

The cover-sheet 32 is permeable with pin-hole penetrations 33 throughout the cover-sheet 32, wherein these pin-hole penetrations 33 allow moisture to permeate through the cover sheet 31.

The invention claimed is:

1. A web frame, being an assembly of stacked, bonded materials, the web frame comprising:
an outer panel; and
a web sandwich comprising:
an inner panel having an inner surface and an outer surface, the inner panel disposed parallel to and apart from the outer panel to form an open space therebetween, wherein the outer panel has an inward surface adjacent the open space;
a plurality of spacers in the open space between the inner panel and the outer panel to maintain the open space therebetween to allow moisture and air through the web frame, wherein each of the plurality of spacers is isolated and separated from each other;
wherein the spacers engage with the panels opposite each other;
wherein the spacers are selected from a group comprising:
(i) spacers formed with the inner panel and extending through the open space to engage with the outer panel; and
(ii) spacers attached to the inner panel and extending through the open space to engage with the outer panel, wherein the web frame is a structural stand-alone wall.

2. The web frame according to claim 1, wherein the inner panel and outer panel have a plurality of fine capillaries extending therethrough, the plurality of fine capillaries allowing moisture and air to permeate.

3. The web frame according to claim 1, wherein the inner and outer panels are comprised of materials selected from the group of materials consisting of reinforced concrete, autoclaved aerated concrete, plywood, fiber cement, metal sheeting, particle board, cardboard, and timber.

4. The web frame according to claim 1, further comprising a blanket layer disposed in the space between the inner panel and the outer panel, wherein the blanket layer is pinned to the inner surface of the outer panel by the plurality of spacers.

5. A web frame, being an assembly of stacked, bonded materials, the web frame comprising a plurality of web-sandwiches, and an outer panel, each of the plurality of web-sandwiches comprising:

an inner panel having an inner surface and an outer surface, the inner panel disposed parallel to and apart from a panel opposite the inner panel to form an open space therebetween, wherein the panel opposite the inner panel has an inward surface adjacent the space;

a plurality of spacers in the open space between the inner panel and the panel opposite the inner panel to maintain the space therebetween to allow moisture and air through the web frame, wherein each of the plurality of spacers is isolated and separated from each other; wherein the spacers are engaged with panels opposite each other;

wherein the outer panel is the panel opposite the inner panel of a first web-sandwich; wherein the first web-sandwich is one of the plurality of web-sandwiches; wherein the first web-sandwich is in series with the remaining web-sandwiches of the plurality of web-sandwiches; and wherein the panel opposite the inner panel of one of the remaining web-sandwiches of the plurality of web-sandwiches is the inner panel of a preceding web-sandwich;

wherein spacers are selected from the group comprising:
(i) spacers formed with the inner panel and extending through the open space to engage with the panel opposite the inner panel; and
(ii) spacers attached to the inner panel and extending through the open space to engage with the panel opposite the inner panel; and wherein the web frame is a structural stand-alone wall.

6. The web frame according to claim 5, wherein the inner panel and panel opposite the inner panel have a plurality of fine capillaries extending therethrough, that allow moisture and air to permeate.

7. The web frame according to claim 5, wherein the outer panel and inner panels are comprised of materials selected from the group of materials consisting of reinforced concrete, autoclaved aerated concrete, plywood, fiber cement, metal sheeting, particle board, cardboard, and timber.

8. The web-frame according to claim 5, further comprising a blanket layer disposed in the space between the inner panel and the panel opposite the inner panel, wherein each blanket layer is pinned to the inner surface opposite each inner panel by the plurality of spacers.

9. A web frame, being an assembly of stacked, bonded materials, the web frame comprising:
an outer panel; and
a web sandwich comprising:
an inner panel having an inner surface and an outer surface, the inner panel disposed parallel to and apart from the outer panel to form an open space therebetween, wherein the outer panel has an inward surface adjacent the open space;
a plurality of spacers in the open space between the inner panel and the outer panel to maintain the open space therebetween to allow moisture and air through the web frame, wherein each of the plurality of spacers is isolated and separated from each other;
wherein the inner panel and outer panel have a plurality of fine capillaries extending therethrough, the plurality of fine capillaries allowing moisture and air to permeate therethrough and the web frame is a structural stand-alone wall;
wherein the spacers engage with the panels opposite each other;
wherein the spacers are selected from a group comprising:
(i) spacers formed with the inner panel and extending through the open space to engage with the outer panel; and
(ii) spacers attached to the inner panel and extending through the open space to engage with the outer panel.

* * * * *